United States Patent [19]
Ranjan et al.

[11] Patent Number: 5,506,017
[45] Date of Patent: Apr. 9, 1996

[54] METHOD FOR TEXTURING MAGNETIC MEDIA

[75] Inventors: Rajiv Y. Ranjan, San Jose; Kuo H. Huang, Sunnyvale; Caroline A. Ross, Mountain View, all of Calif.

[73] Assignee: Komag Incorporated, Milpitas, Calif.

[21] Appl. No.: 482,510

[22] Filed: Jun. 7, 1995

[51] Int. Cl.$^6$ ..................................................... B32B 3/02
[52] U.S. Cl. .................. 428/65.7; 204/192.2; 427/128; 427/129; 427/130; 427/131; 427/132; 427/295; 427/318; 427/319; 427/320; 427/327; 427/328; 427/372.2; 427/383.1; 427/404; 428/457; 428/694 T; 428/694 TS; 428/694 TR; 428/900
[58] Field of Search .................. 427/128–132, 427/295, 318, 319, 320, 327, 328, 372.2, 383.1, 404; 428/457, 694 T, 694 TS, 694 TR, 900; 204/192.2

[56] References Cited

U.S. PATENT DOCUMENTS

| | | | |
|---|---|---|---|
| 4,326,229 | 4/1982 | Yanagisawa | 360/135 |
| 4,499,122 | 2/1985 | Economy et al. | 427/130 |
| 4,698,251 | 10/1987 | Fukuda et al. | 428/64 |
| 4,898,774 | 2/1990 | Yamashita et al. | 428/336 |
| 4,973,496 | 11/1990 | Kruger et al. | 427/129 |
| 5,004,652 | 4/1991 | Lal et al. | 428/611 |
| 5,047,274 | 9/1991 | Tsuya et al. | 428/64 |
| 5,049,451 | 9/1991 | Lal et al. | 428/611 |
| 5,053,250 | 10/1991 | Baseman et al. | 427/131 |
| 5,057,200 | 10/1991 | Lal et al. | 204/192.15 |
| 5,062,021 | 10/1991 | Ranjan et al. | 360/135 |
| 5,082,709 | 1/1992 | Suzuki et al. | 428/64 |
| 5,116,658 | 5/1992 | Miyake | 428/141 |
| 5,119,258 | 6/1992 | Tsai et al. | 360/135 |
| 5,302,434 | 4/1994 | Doerner et al. | 428/64 |
| 5,307,223 | 4/1994 | Doerner et al. | 360/97.01 |

FOREIGN PATENT DOCUMENTS

| | | |
|---|---|---|
| 0440259A2 | 8/1991 | European Pat. Off. . |
| 0583989A2 | 2/1994 | European Pat. Off. . |
| WO93/21629 | 10/1993 | WIPO . |

OTHER PUBLICATIONS

"Dual–Carbon, A New Surface Protective Film For Thin Film Hard Disks", Ishikawa, et al., IEEE Trans. Magnetics, vol. Mag 22, No. 5, pp. 999–1001, Sep. 1986.

*Primary Examiner*—Bernard Pianalto
*Attorney, Agent, or Firm*—Skjerven, Morrill, MacPherson, Franklin & Friel; Kenneth E. Leeds

[57] ABSTRACT

This patent teaches a new method of roughening the surface of a magnetic recording medium in order to reduce the stiction and friction between a recording head and the medium to thereby improve mechanical reliability. During this method, the medium substrate is heated to form second phase precipitates which result in roughening of the medium surface. The medium roughness can be controlled by proper selection of the heating temperature and time and the substrate alloy. This results in improved contact-start-stop (CSS) performance of the medium. The method of the present invention allows for lower costs and potentially higher throughput than conventional texturing processes.

26 Claims, 18 Drawing Sheets

Schematic Diagram of Bump-texture Formation

| Heater Temperature | Cross-Section | Zygo Peak-Valley (P-V) | AFM P-V | Zygo Ra | AFM Ra |
|---|---|---|---|---|---|
| a) 180-270°C | 〰️ | 95Å | | 13-15Å | |
| b) 280°C | ╲╱╲╱ | 440Å | | 26Å | |
| c) 290°C | ╲╱╲╱╲╱ | 540Å | 690Å | 51Å | 41Å |
| d) 300°C | ∿∿∿ | 670Å | 880Å | 99Å | 80Å |
| e) 310°C | ∿∿∿∿ | 1280Å | 1800Å | 168Å | 152Å |
| f) 370-380°C | ╲╱╲╱╲╱ | 180Å | | 20Å | |

FIG. 4

FIG. 6
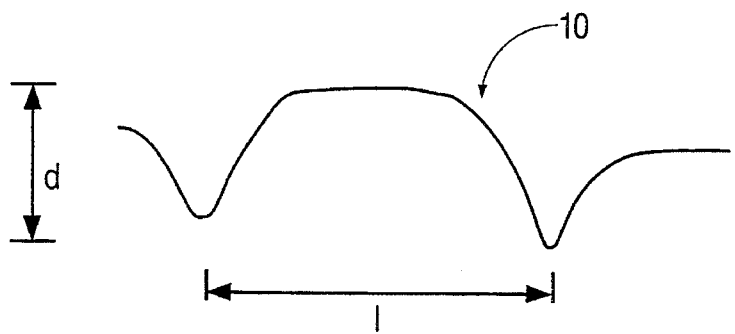
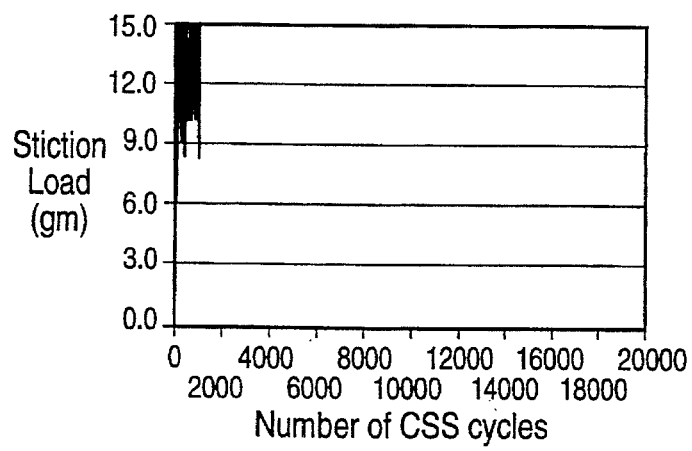
FIG. 7a
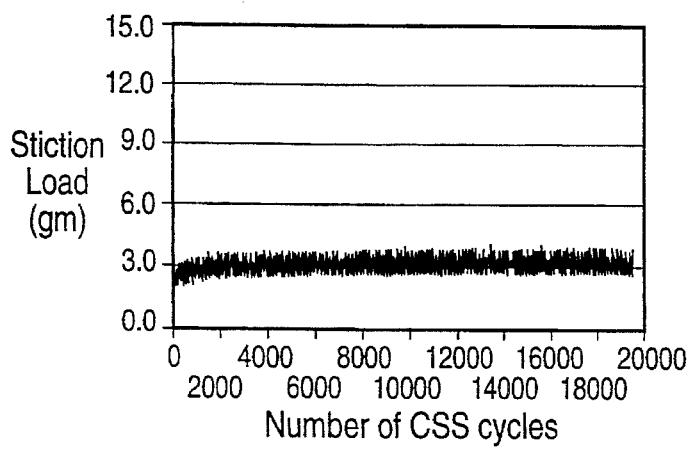
FIG. 7b

METHOD FOR TEXTURING MAGNETIC MEDIA

BACKGROUND

This invention relates to methods for texturing substrates used in magnetic disks.

In a conventional disk drive, a recording head "lands" and "takes-off" from a magnetic recording medium surface during the stopping and starting of the drive. When the medium spins at its normal operating rotational velocity, the recording head does not touch the medium, but instead "flies" on an air cushion between the head and the medium. For high recording performance and density, the recording head should be kept as low as possible during flying. This is accomplished by making the medium as smooth as possible. However, if the medium is too smooth, stiction and friction between the head and the medium during starting and stopping of the drive will be excessive. Such excessive friction and stiction adversely affect the overall mechanical reliability of the drive. For example, stiction and friction can cause wear of the recording medium, and eventually a head crash. Thus, recording media manufacturers must provide some roughness on media but not so much as to substantially increase the effective spacing between the magnetic film and the head. It is also noted that roughening the medium may also affect its magnetic properties, and care must be taken to avoid degrading these magnetic properties.

The current approach in industry is to mechanically roughen the medium substrate surface using, for example, a tape embedded with hard particles. When texturing using the tape approach the substrate is usually held on a spindle and rotated at a predetermined velocity while the tape moves over the substrate surface. U.S. Pat. No. 4,973,496, issued Kruger et al., discusses a similar approach, in which an abrasive free tape is fed around a roller and a slurry of abrasive particles is fed onto the tape surface prior to its engagement against the substrate surface.

In a another approach currently used in the industry, a substrate is held by a chuck and rotated over a flat surface having loose hard particles floating in a slurry. This type of machine can be commercially purchased, for example, from Strausbaugh Inc., of California. U.S. Pat. No. 4,698,251, issued to Fukuda et al., teaches such an approach.

In both these approaches, which are practiced by over ninety percent of the media manufacturers, the substrates must be properly cleaned by appropriate apparatus to remove any loose or embedded particles before the substrates are put in sputtering machines for film deposition. Thus, practicing these approaches requires a significant capital investment in the form of both texturing and cleaning apparatus.

It is also known in the art to roughen substrates with chemical etchants. For example, in U.S. Pat. No. 4,326,229, issued to Yanagisawa, radially extending jogs or undulations are formed by spin coating a special solvent onto a substrate surface.

In another approach taught by Tsuya et al. in U.S. Pat. No. 5,047,274, a substrate surface is anodized to form small vertical pores which are then packed by a nonmagnetic material like Cu, and then polished and etched to form a finely roughened surface.

In yet another approach described in U.S. Pat. No. 5,119,258, issued to Tsai et al., the surface of a glass substrate is textured using a plasma etching technique. A similar approach is taught by Doerner et al. in U.S. Pat. No. 5,307,223 for microroughening a NiP plated Al substrate using plasma etching.

As mentioned above, the existing tape texturing or slurry-texturing method requires cleaning and drying steps to remove any loose particle adhering to the substrate surface. This increases the overall manufacturing cost. Similarly, texturing methods requiring chemical etching also require cleaning and drying steps before sputtering. Texturing methods employing plasma etching require a special process station and may suffer from a lack of uniformity of gas flow, thereby reducing yield.

It is also known in the art to zone texture a magnetic medium. In other words, the medium contains a first zone where the read-write head takes off and lands (a "CSS zone"), and a second zone where data is recorded (a "data zone"), wherein the data zone is smooth and the CSS zone is rough. It is also known to provide a "transition region" of gradually decreasing roughness between the CSS and data zones to make it easier for the read-write head to move from the CSS zone to the data zone and back. See, for example, European application EP 0 583 989 A2, incorporated herein by reference. Providing zone texturing with a transition region has been difficult using prior art texturing techniques, and the results have been unsatisfactory.

One object of our invention is to provide a low cost texturing method. Another object of our invention is to provide a high throughput texturing process which can be easily implemented in the apparatus used to deposit the various layers of a magnetic medium. Another object of our invention is to provide a texturing method whereby it is unnecessary to clean the substrate before or after texturing. An object of one embodiment of our invention is to zone texture a magnetic medium and to provide a transition region between the CSS and data zones.

SUMMARY OF THE INVENTION

In accordance with our invention, a magnetic recording medium substrate is heated to thereby form a texture including fine protrusions and depressions on the substrate surface. The height and depth of these protrusions and depressions can be controlled by properly selecting the heater power and exposure time. In one embodiment, the substrate comprises a solid solution. The protrusions and depressions result from phase transformation of material within the substrate which causes formation of precipitate regions in the substrate. (As is known in the art, a "phase" is a physically homogeneous part of a material system. "Precipitation" occurs when a material leaves a solution. In this case, during precipitation, material within the substrate comes out of solid solution and forms and above-mentioned precipitate regions. This process can entail diffusion of one or more of the substrate constituents through the substrate material to the precipitate regions. The precipitate regions typically have a density different from the initial density of the bulk substrate material.)

In one embodiment, the substrate comprises a solid solution having at least first and second constituents. By heating the substrate, portions of the first and second constituents form a second phase (sometimes referred to as a $\beta$ phase) and this second phase precipitates out of the solid solution. The second phase typically has a different composition than the first phase.

In one embodiment, the first constituent is Al and the second constituent is Li. The Li content can be, for example, 12 at. %. By heating the substrate, AlLi intermetallic $\beta$ phase regions form and precipitate out of the solid AlLi solution. The β phase regions typically contain between 45 and 55 at. % Li, with the remainder being Al. In other embodiments, instead of Li, the second constituent is Mg, Si, Co, Cr and/or Cu.

In a second embodiment, after heating an intermetallic compound precipitates out of the solid solution. For example, the substrate may initially comprise a solid solution of mostly Al but including Mn, Nb and/or Ni. For the case of Mn, intermetallic compound regions of $Al_6Mn$ form. For the case of Nb, $Al_3Nb$ intermetallic compound regions form, whereas for Ni, $Al_3Ni$ intermetallic compound regions form.

In a third embodiment, the substrate initially comprises a super saturated solid solution of a first phase comprising at least first and second constituents. By heating the substrate, regions form within the substrate having a second phase comprising essentially just the second constituent. For example, initially the substrate can be a super saturated solid solution comprising mostly Al but also including Ge. The substrate essentially has one phase typically having a face-centered cubic crystal structure. By heating the substrate, regions form comprising a second Ge rich phase (about 99.6 wt % Ge). Alternatively, the substrate can contain Pb or Sn in lieu of or in addition to Ge.

In accordance with one embodiment, a Ni-P mechanical support layer is plated onto the Al substrate prior to texturing but in other embodiments, a Ni-P layer is not present on the substrate prior to texturing. The heating process is very quick, generally takes less than 20 seconds and typically takes less than 10 seconds. Although slower heating can also be applied to the substrate, heating at a faster rate has the advantage that it can be incorporated with the deposition process and thereby reduce cost and improve throughput. Heating rates can be between 1° to 1000° C./second and typically about 10° to 200° C./second, depending on the substrate alloy selected and its melting temperature. (In general, with a lower melting temperature, a lower heating rate is desirable. For an Al alloy substrate, a heating rate of 10° to 200° C./second is desirable.)

In an alternate embodiment of our invention, only a portion of the disk surface is textured, e.g. in a CSS zone. Restricting heat exposure to the CSS zone can be accomplished by using a water cooled mask plate with a hole in the center. The exposed area has the highest degree of heating and therefore roughening. The adjacent area experiences a decreasing temperature gradient due to heat conduction to the rest of the substrate. This results in a ramp texture roughness (i.e. a transition region) that decreases to a specular surface at a data zone surrounding the CSS zone. This is a very reliable texture surface for permitting a recording head to access the data zone and the CSS zone during read/write and CSS operations, respectively. Selective heating can also be accomplished using an annular heating lamp ring whose diameter and thickness is selected based on the size of the desired CSS zone.

In a zone-texturing embodiment, care should be given in selecting the substrate material and heating parameters or the stress gradient in the substrate caused by the temperature gradient during heating could warp the substrate. Symmetry should be maintained vis-a-vis the structures on each side of the substrate, and in particular, for Ni-P plated Al substrates, the thickness of the Ni-P on each side of the substrate should be maintained to be nearly identical. Further, the stresses caused in the substrate on each side should be maintained to be nearly identical.

In another embodiment, a magnetic medium includes a substrate comprising glass, ceramic, carbon or other material. A 10 nm to 10 μm alloy layer is formed on the substrate by a thin film deposition technique (e.g. sputtering or other vacuum deposition technique). The substrate is then heated either selectively or completely to roughen the alloy layer surface by forming protrusions and depressions. This roughening step reduces stiction and friction exhibited by the resulting magnetic medium. In one embodiment, the alloy is an Al alloy comprising one or more of the following materials: Si, Mg, Fe, Cu, Zn, Mn, Cr, Mo, W, V, Nb, Ta, Ti, Zr and Hf.

BRIEF DESCRIPTION OF THE DRAWINGS

FIG. 4 is a schematic diagram showing different stages of bump texture formation and the corresponding Ra and peak-to-valley values of the surface texture.

FIG. 6 shows a cross-section of a texture bump.

FIGS. 7a and 7b show CSS performance of media without and with the bump texture produced by a method in accordance with our invention, respectively.

DETAILED DESCRIPTION

Forming Texture Bumps on a Substrate By Heating

A method in accordance with a first embodiment of our invention comprises the step of heating a substrate to thereby form texture bumps on the substrate. A magnetic alloy is thereafter deposited on the substrate.

The substrate is typically a solid solution, and during heating, at least one of the constituents of the solid solution precipitate out of the solution to form precipitate regions. The precipitate regions generally have a density that is different from the bulk substrate material in its initial form.

Figure 15:
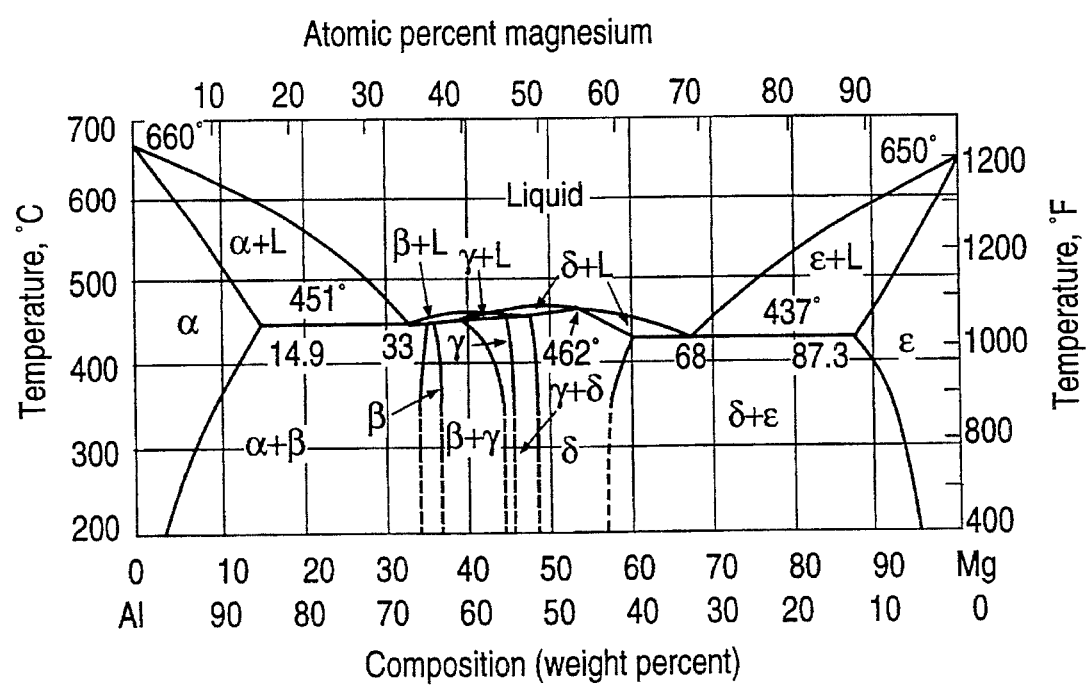
FIG. 15 is a phase diagram for an Al-Mg alloy.

By way of example, consider FIG. 15, which is a phase diagram for a Al-Mg alloy. In one embodiment of our invention, the substrate is initially a super saturated solid solution comprising about 18 at. % Mg and 82 at. % Al in the α phase. Pure aluminum normally has a face-center-cubic ("fcc") structure, depicted as the α phase in FIG. 15. As one adds Mg, a β phase comprising $Al_3Mg_2$ forms (see the phase diagram region labelled "α+β").

At room temperature, an 18 at. % Mg/82 at. % Al mixture in its equilibrium state will contain regions of α phase material and β phase material. However, in our invention, one commences with a substrate having super saturated material in the α phase. By heating the substrate, β phase material ($Al_3Mg_2$) comes out of solid solution, to thereby form precipitate regions. This causes texture bumps to form on the substrate surface.

Figure 16:
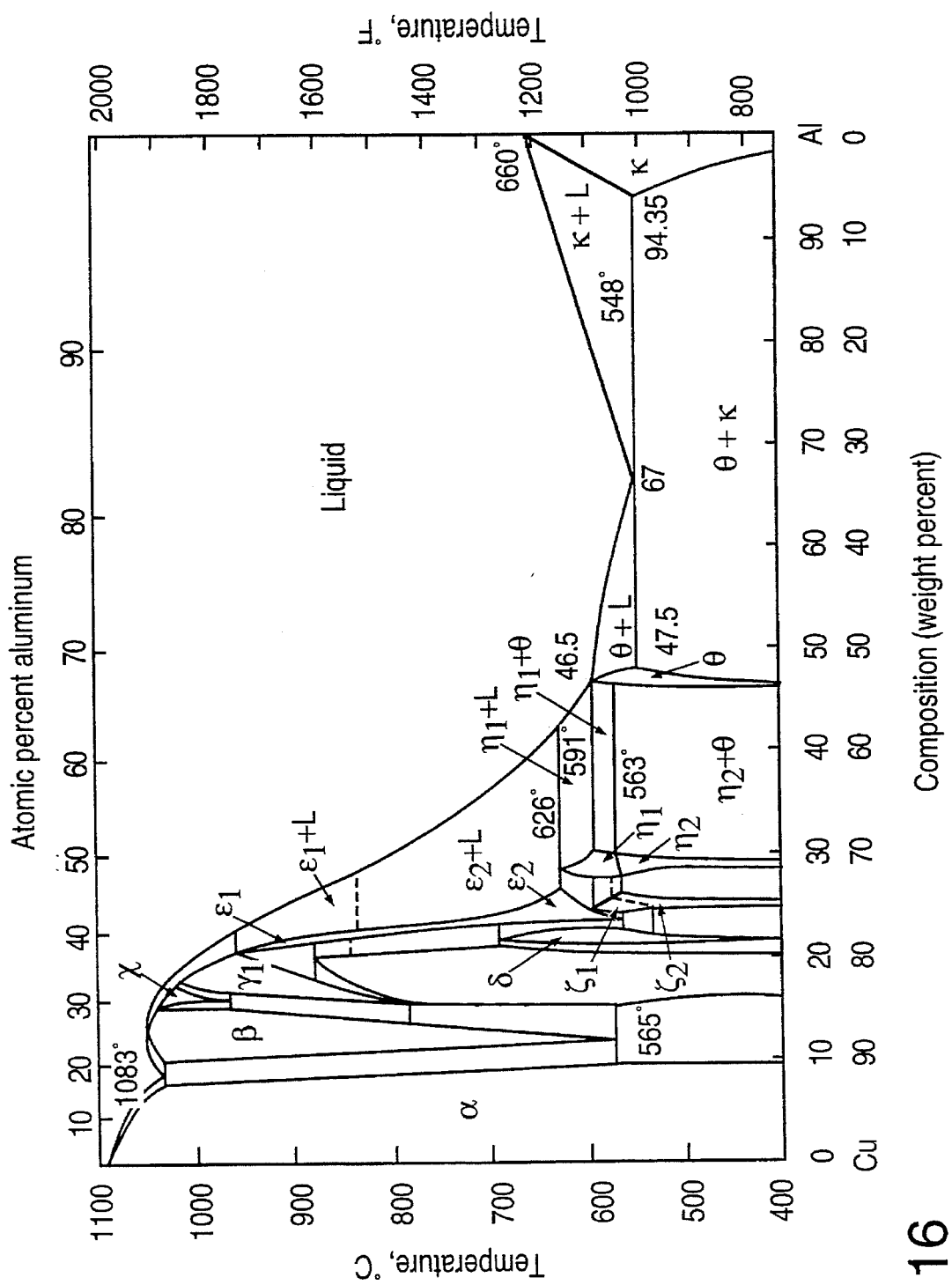
FIG. 16 is a phase diagram for an Al-Cu alloy.

FIG. 16 shows a Al-Cu phase diagram. In this diagram, the phase for pure Al is labelled κ. A substrate in accordance with one embodiment of our invention comprises about 4% Cu and 96% Al in a super saturated solution. By heating the substrate, regions having the phase labelled θ in FIG. 16 precipitate out to form texture bumps on the substrate. (Regions θ comprise $CuAl_2$.)

In the case of FIG. 15, the substrate heating temperature should not be so high that the substrate is in region α or region α+L. In FIG. 15, one should avoid annealing the substrate at a temperature that brings the substrate into region κ or region κ+L.

In general, Al is an excellent material to use as the main constituent in a substrate because it is light and strong. Thus, in one embodiment, the substrate is an Al-based alloy comprising between 0.1 and 30 wt. % of one or more of Si, Mg, Li, Mo, Y, V and W, and/or between 0.5 and 5 wt. % of one or more of Cu, Cr, Mn, Nb and Ta.

Table I below lists a number of alloys that can be used in conjunction with our invention.

TABLE I

| | |
|---|---|
| 88 at. % Al/12 at. % Li | Forms a β phase of AlLi |
| 82 at. % Al/18 at. % Mg | Forms a β phase of $Al_3Mg_2$ |
| 98 at. % Al/2 at. % Si | Forms a β phase of AlSi |
| 99.5 at % Al/0.5 at. % Co | Forms a β phase of $Al_{82}Co_{18}$ |
| 99.6 at. % Al/0.4 at. % Cr | Froms a β phase of essentially Cr. |
| 96 at. % Al/4% at. Cu | Forms a θ phase of $CuAl_2$ |

It is noted that Li and Mg have a relatively high solid solubility in bulk Al, whereas Si, Co, Cr and Cu have a relatively low solid solubility on bulk Al. The precipitate regions generally nucleate at grain boundaries. Some heating is required to cause this precipitation, but this can be accomplished at temperatures below 600° C. Precipitation can be caused in some alloys (AlMg) at lower temperature (e.g. 450° C.).

In another embodiment, a super-saturated solid solution (either crystalline or amorphous) is heated to thereby form texture bumps by phase separation. In one embodiment, the solution comprises at least a first constituent (e.g. Al) and a second constituent (e.g. Ge). By heating the substrate, the second constituent comes out of solution to form regions having a phase different from that of the super saturated solid solution. The second phase may be predominantly the second constituent or some mixture of the second and first constituents. AlPb or AlSn solid solutions can also be used.

In one embodiment, the substrate has a relatively low melting point (e.g. less than 700° C.). Metals such as Al, Mg or Li can be used as the base material (i.e. the majority constituent) for the substrate. The temperature required for precipitation for such a material is generally lower than a high melting point material. It is thus generally convenient to use a low melting point material during manufacturing. However, for manufacturing processes in which this is not a consideration, higher melting point materials can be used as the base material, such as Cu, Ti, V, stainless steel or other alloys of Ni, Fe, Cr, V, etc.

Information concerning phase diagrams of alloys can be found, for example, in "Binary Alloy Phase Diagrams", Vol 1 and 2, edited by T. B. Massalski, published in 1986 by the American Society of Metals at Metals Park, Ohio. These volumes are incorporated herein by reference.

As mentioned above, prior to heating, the substrate is in a non-equilibrium condition, e.g. a super-saturated solid solution. A typical manufacturing process for such substrates involves forming molten alloy material into ingots, rolling the ingots (which are still hot) into sheets, stamping the sheets to form disk-shaped substrates, and cooling the substrates rapidly so that they do not go into an equilibrium state. (Such rapid cooling is known as quenching.)

The substrate may be between 10 and 60 mils thick, and between 25 and 130 mm in diameter, but the thickness and diameter of the substrate are not critical to our invention. In one embodiment, the substrate is 31.5 mils thick, and is substrate type MR 758, available from Mitsubishi International of Campbell, Calif.

Overview of the Disk Manufacturing Process

Figure 1:
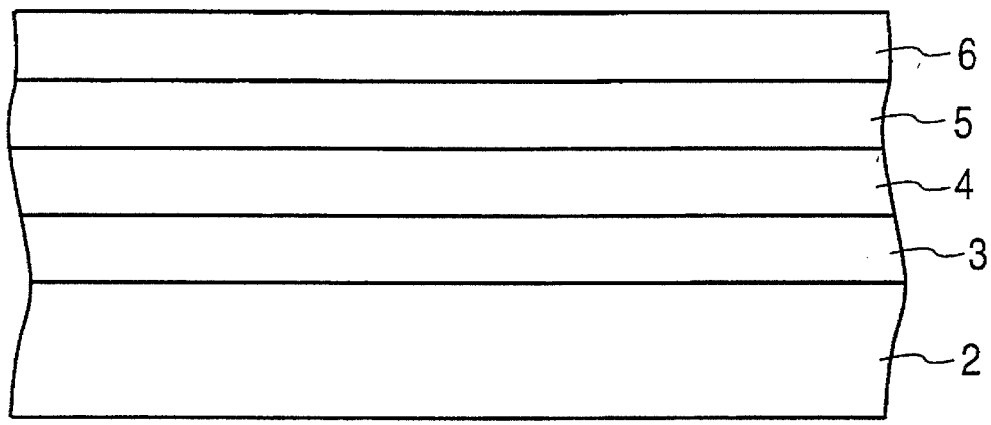
FIG. 1 illustrates a magnetic recording medium constructed in accordance with one embodiment of our invention.

In one embodiment of our invention, a substrate 2 is cleaned and polished, and a Ni-P layer 3 is plated onto substrate 2 (FIG. 1). As mentioned above, substrate 2 comprises a solid solution in a non-equilibrium state, and typically comprises an Al alloy. Ni-P layer 3 is generally between 5 and 20 μm thick, and serves as a mechanical support layer so that during use, a read-write head does not dent the medium if it strikes the medium. (In another embodiment of our invention, layer 3 can be a mechanically hard material other than Ni-P and can be formed by techniques other than plating. In other embodiments, layer 3 may be absent.)

Substrate 2 is then heated, which causes texture bumps to form on the medium. In one embodiment, the medium is heated to between 100° and 500° C., and preferably between 200° and 350° C. It may be desirable to keep the temperature at or below 300° C. The primary considerations in temperature selection include the following:

(1) Melting alloy substrate 2 is to be avoided.

(2) If the temperature is too high, Ni-P layer 3 changes phase and becomes magnetic (an undesirable result).

(3) The temperature should be high enough to form texture bumps.

In some embodiments, it may be desirable to heat the substrate symmetrically (e.g. applying heat to both sides of the substrate) to avoid warping it.

In one embodiment, the texture bumps cause the resulting medium to have a roughness Ra between 5 and 10 nm, and preferably between 7 and 8 nm as measured by an atomic force microscope ("AFM"), e.g. manufactured by Park Scientific, Inc. of Mountain View, Calif.

After heating, an underlayer 4 such as a Cr or Ni-P underlayer is formed on Ni-P layer 3. Such underlayers are described, for example, in U.S. Pat. No. 4,786,564, issued to Chen et al., incorporated herein by reference, and are used to control various characteristics of a subsequently deposited magnetic layer. For example, a Cr underlayer may be used to increase coercivity. The '564 patent teaches various Ni alloys which reduce bit shift, minimize noise, increase resolution and cause the magnetic layer to exhibit uniform magnetic characteristics. (In other embodiments of our invention, underlayer 4 need not be formed in the magnetic recording medium.)

Thereafter, a magnetic layer 5 is formed. Magnetic layer 5 is typically a Co or Fe alloy, e.g. as described in U.S. Pat. Nos. 5,180,640 or 4,749,459, issued to Yamashita et al., incorporated herein by reference.

Thereafter, a protective layer 6 is deposited onto the medium, e.g. a hydrogenated carbon layer as disclosed in European Application EP 0 440 259 A2 or a $ZrO_2$ layer as disclosed in U.S. Pat. Nos. 4,929,500 or 4,898,774, issued to Yamashita et al. (incorporated by reference). A conventional lubricating layer is then formed on the medium.

Of importance, layers 4, 5 and 6 can be formed in an in-line sputtering system such as an Ulvac sputtering apparatus. (Ulvac is a corporation of Japan.)

Figure 14:
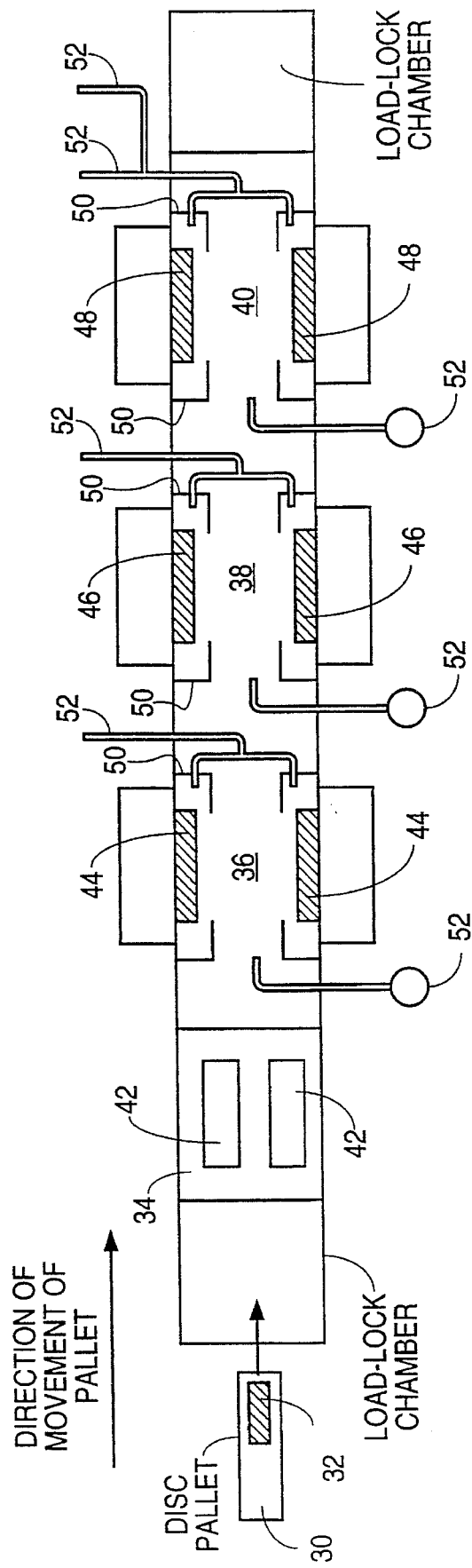
FIG. 14 schematically illustrates sputtering apparatus including a heating chamber used to heat and thereby texture magnetic recording media substrates.

Referring to FIG. 14, in one embodiment, a pallet 30 in an in-line sputtering apparatus transports a substrate 32 past a heater chamber 34 for texturing prior to transporting the substrate past a Ni-P sputtering chamber 36, a magnetic layer sputtering chamber 38 and an overcoat sputtering chamber 40. Also shown in FIG. 14 are heating elements 42 for heating the substrate, Ni-P sputtering targets 44, magnetic alloy sputtering targets 46, carbon sputtering targets 48, target shields 50, and gas in flow and outflow conduits 52. Further information concerning the FIG. 14 apparatus is provided in the above-incorporated '259 Application.

Figure 9:
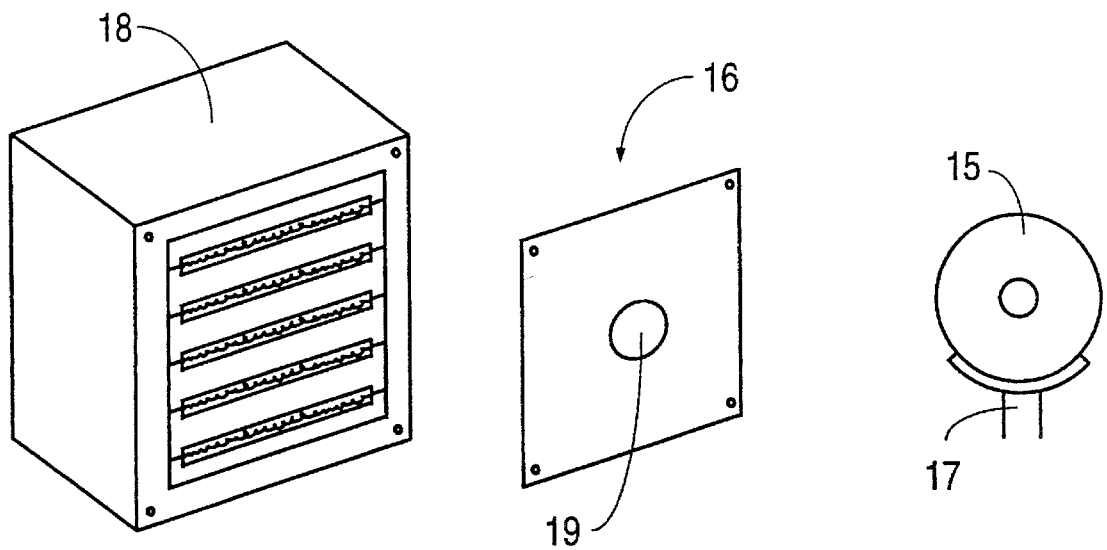
FIG. 9 schematically shows a heat lamp assembly for texturing a magnetic recording medium.

In yet another embodiment, a single disk sputtering system such as an Intevac sputtering machine model no. MDP-350, 250A or 250B is used. (Intevac is a corporation located in Santa Clara, Calif.) The Intevac sputtering machine has at least one heating chamber which can texture the substrate. In another embodiment, the heater in the Intevac Machine can be modified as shown in FIG. 9, discussed below, to zone texture a substrate.

Experimental Results

Figure 2A:
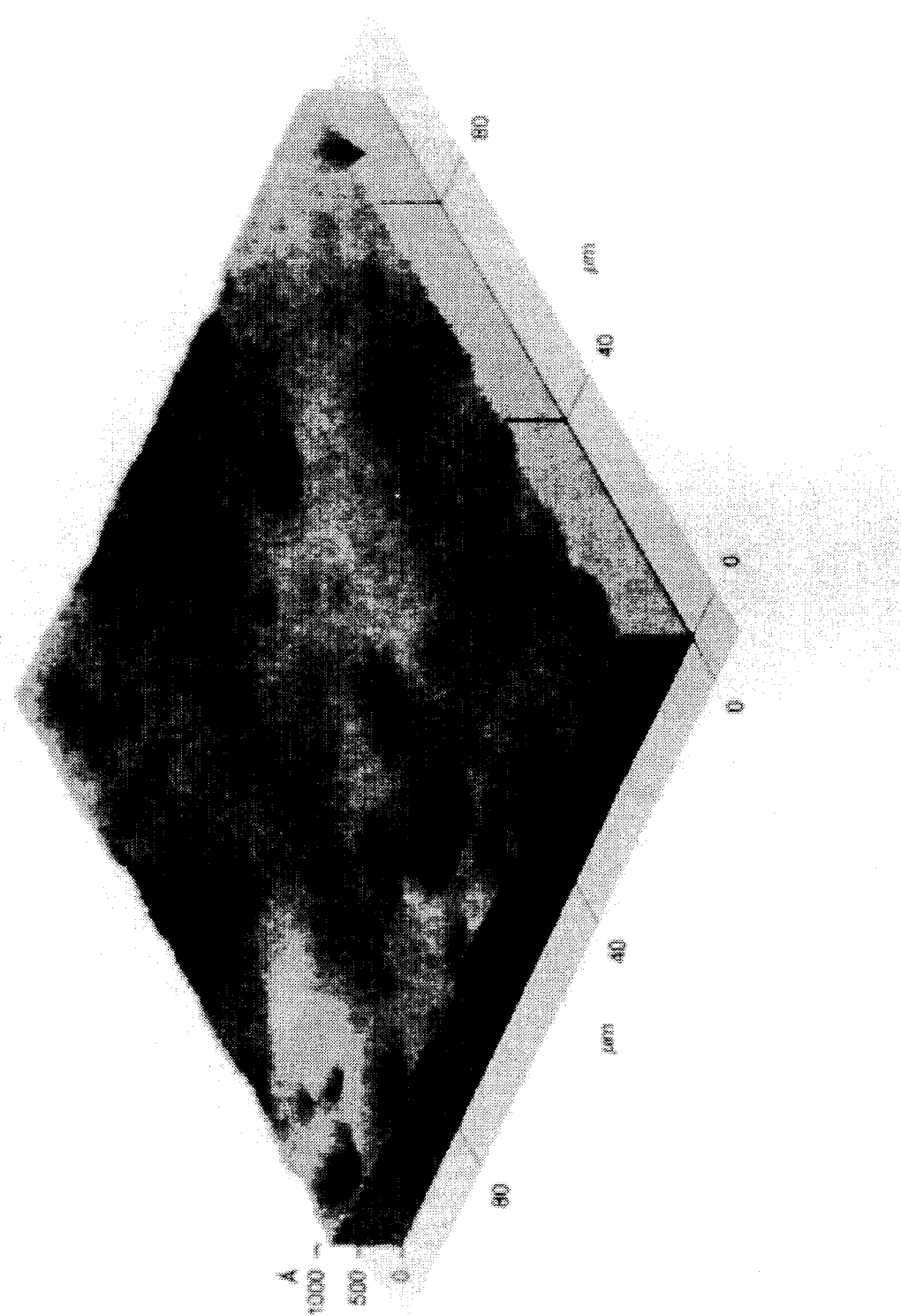
FIGS. 2a, 2b and 2c are atomic force microscopy (AFM) photographs of an Al alloy substrate surface texture produced by heating the substrate.
Figure 2B:
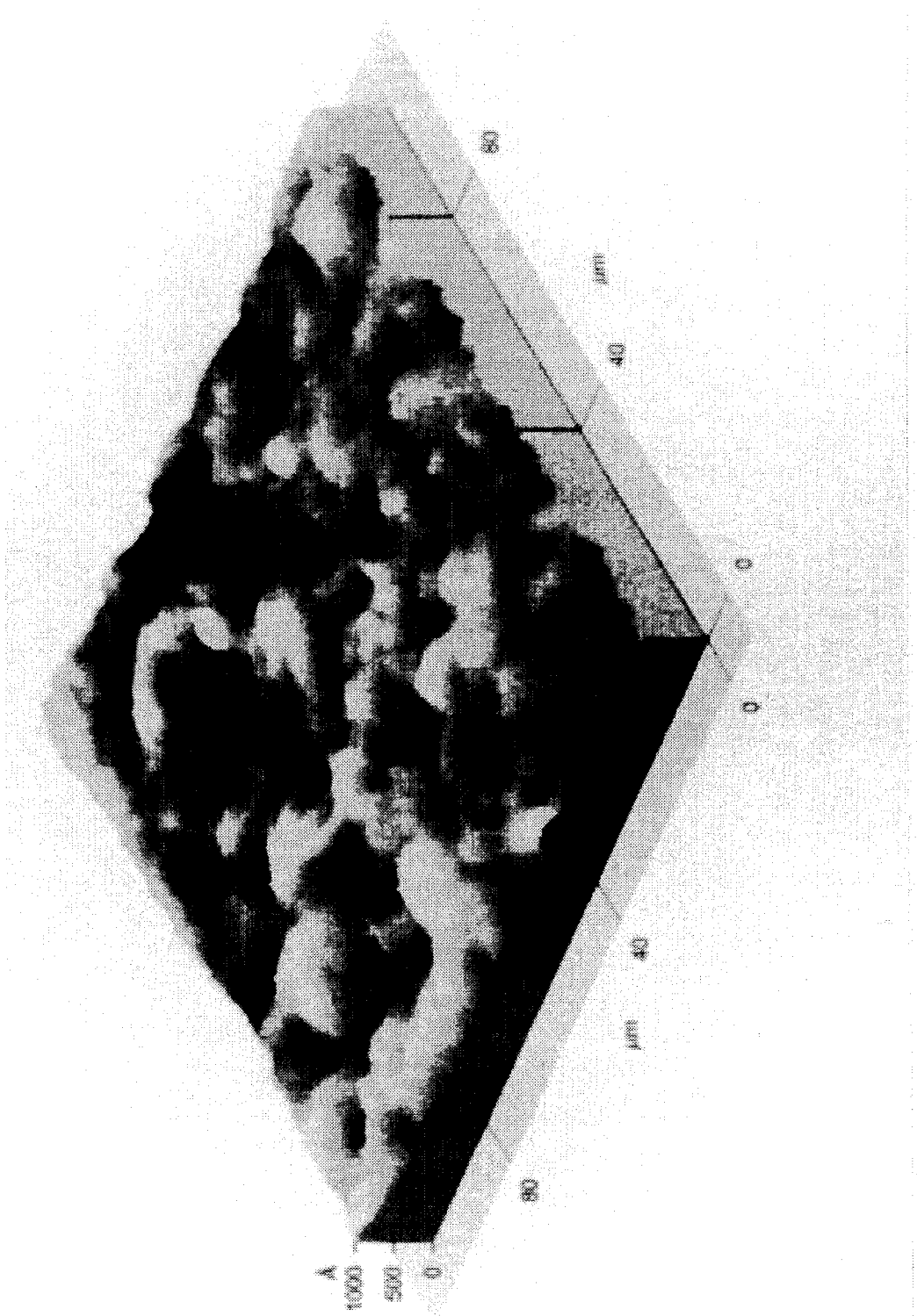
Figure 2C:
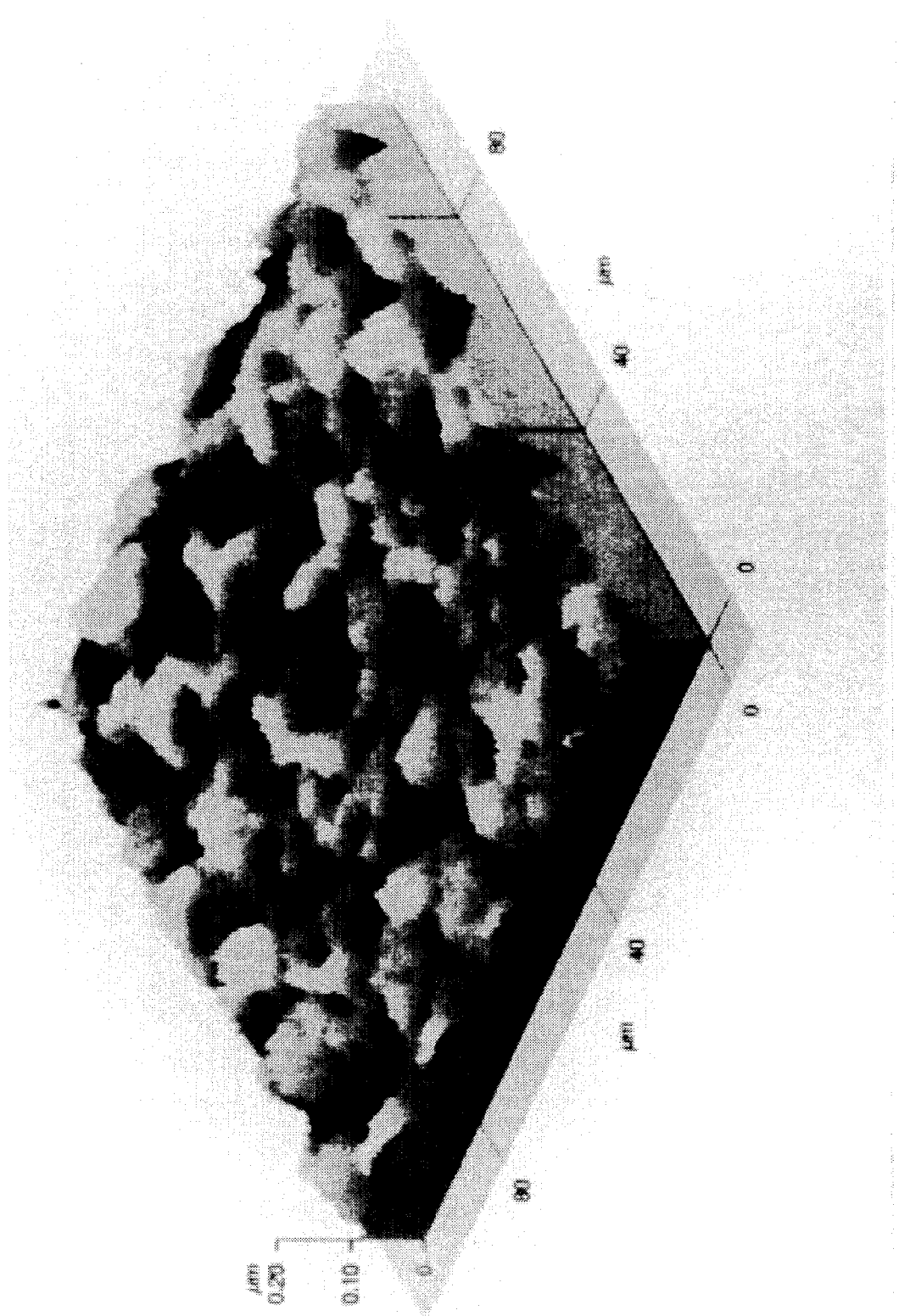

FIGS. 2a, 2b and 2c show the surface topography of Ni-P plated Mitsubishi MR 758 substrates which were exposed to different heater power. These substrates comprised mostly Al, with less than or equal to about 5 wt. % Mg and less than or equal to about 5 wt. % Si. The resulting substrate temperatures were measured using a non-contact temperature sensor. The arithmetic average roughness, Ra, and peak-to-valley distance for the resulting texture was measured using a ZYGO mark-IV optical interferometer (manufactured by Zygo Corp. of Tempe, Ariz.) and an AFM. Note that the disks were heated for less than 6.5 seconds at a fixed heater power. For a temperature below 270° C., the substrate surface roughness did not change and remained the same as that of an as-received substrate. When the substrate temperature was raised to 290° C., depressions as deep as 44 nm started forming, as shown in FIG. 2a. When the heater power was further increased to heat a substrate to 300° C., the substrate surface became rougher and protrusion areas began to form as shown in FIG. 2b. Thus, although the peak-to-valley distance did not change significantly (67 nm) the Ra increased to 9.9 nm. FIG. 2c shows that if the substrate was heated to a higher temperature (in this case 310° C.), the texture surface became progressively rougher. It should be noted that in FIGS. 2a, 2b and 2c, immediately after heating, a 75 nm thick Cr underlayer, a 50 nm thick CoCrTa magnetic layer, and a 20 nm thick carbon layer were sputtered onto the substrate in that order.

Figure 3A:
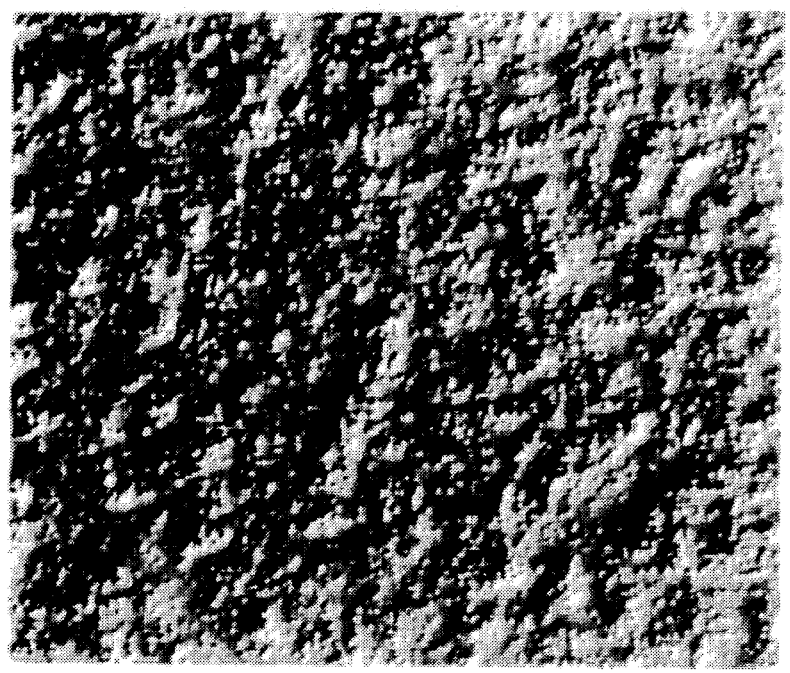
FIGS. 3a and 3b are optical micrographs of substrates textured by a method in accordance with our invention.
Figure 3B:
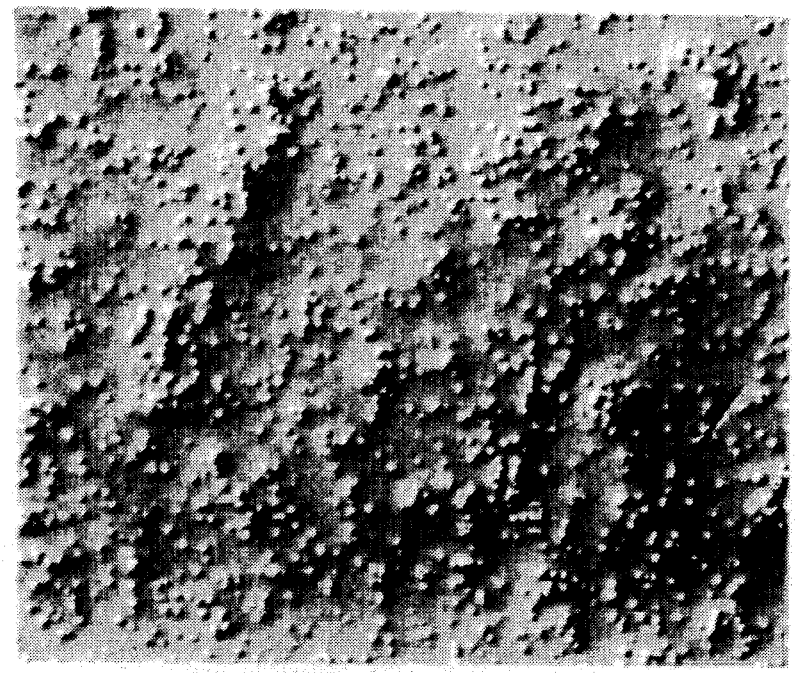

FIGS. 3a and 3b are optical micrographs of disks including substrate made of a 5486 Al alloy comprising 5.5 wt. % Mg; 0.3 wt. % Mn; 0.1 wt. % Zn; 0.06 wt. % Cr; 0.06 wt. % Fe; 0.07 wt. % Cu; 0.03 wt. % Si; and the remainder Al. The substrates were heated at 3000° C. for about 6.5 seconds using the lamp heaters of the Intevac MDP-250 sputtering apparatus. A Ni-P layer was not plated onto the substrate. Rather, the following layers were sputtered onto the substrate in this order; 75 nm thick Cr, 50 nm thick $Co_{84}Cr_{10}Ta_6$ and 20 nm thick hydrogenated carbon. Rounded bumps can be seen. As described below, such bumps reduce the effective contact area between a read-write head and a disk to thereby improve mechanical reliability of a disk drive. FIG. 3a is magnified at 100x; FIG. 3b is magnified at 200x.

FIGS. 4a, 4b, 4c, 4d, 4e and 4f are schematically summarizes and tabulates texture bump formation during a process in accordance with our invention. Four measurements are shown in FIGS. 4a, 4b, 4c, 4d, 4e and 4f:

(1) The peak-to-valley distance measured by the Zygo apparatus described above;

(2) The peak-to-valley distance as measured by the AFM;

(3) The Ra value as measured by the Zygo apparatus; and (4) The Ra value as measured by the AFM.

The FIG. 3 substrates had the same composition as the substrates in FIG. 2.

In FIGS. 4a 4b, 4c, 4d and 4e, after heating, a Cr underlayer, a CoCrTa magnetic layer and a carbon overcoat were thereafter sputtered onto the substrate. These sputtering steps added further heat to the substrates. For the case of FIG. 4f, no additional layers were applied to the substrate, and thus further heating caused by sputtering did not occur.

Figure 5A:
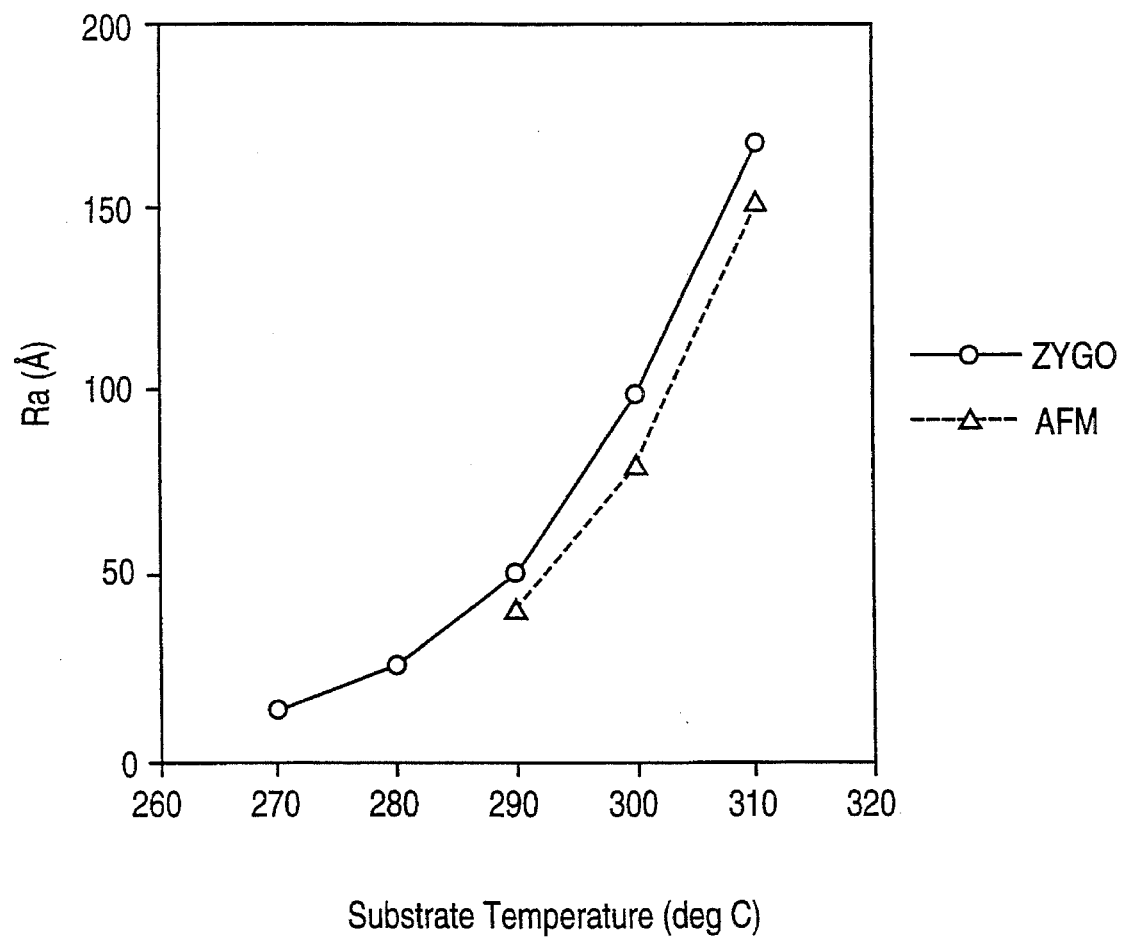
FIGS. 5a and 5b show Ra and peak-to-valley values of a texture produced under different heater power and exposure times, respectively.
Figure 5B:
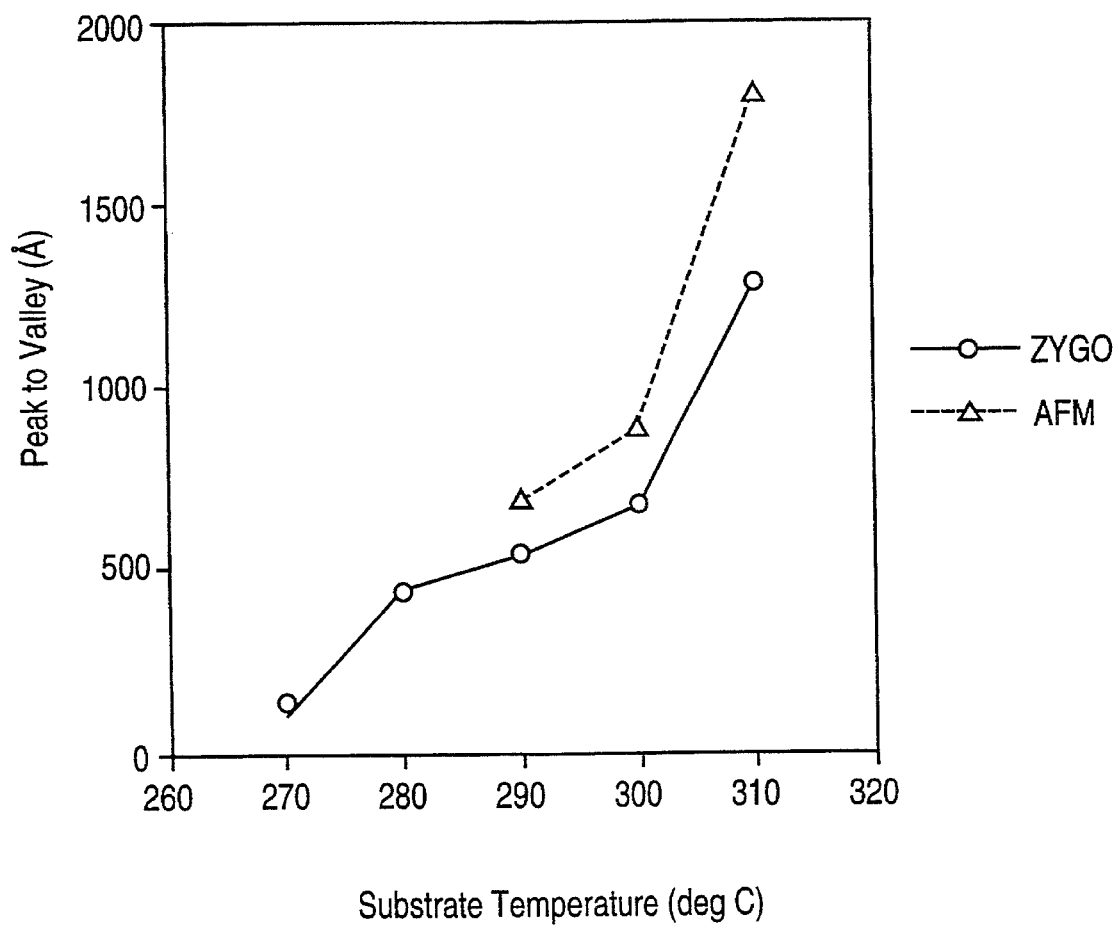

FIGS. 5a and 5b show the Ra and peak-to-valley distance of a bump texture formed by exposing Al substrates to different heater power. The Al substrates had the same composition as the alloys of FIGS. 2a, 2b and 2c. The temperatures indicated are the temperatures of the substrate measured by using an IR sensor (manufactured by Omega Engineering, Inc. of Connecticut). This was not an in situ measurement during heating. It is believed that the actual substrate surface temperature was much higher during exposure to the heating lamps and could be as high as 400° to 600° C.

Figure 5C:
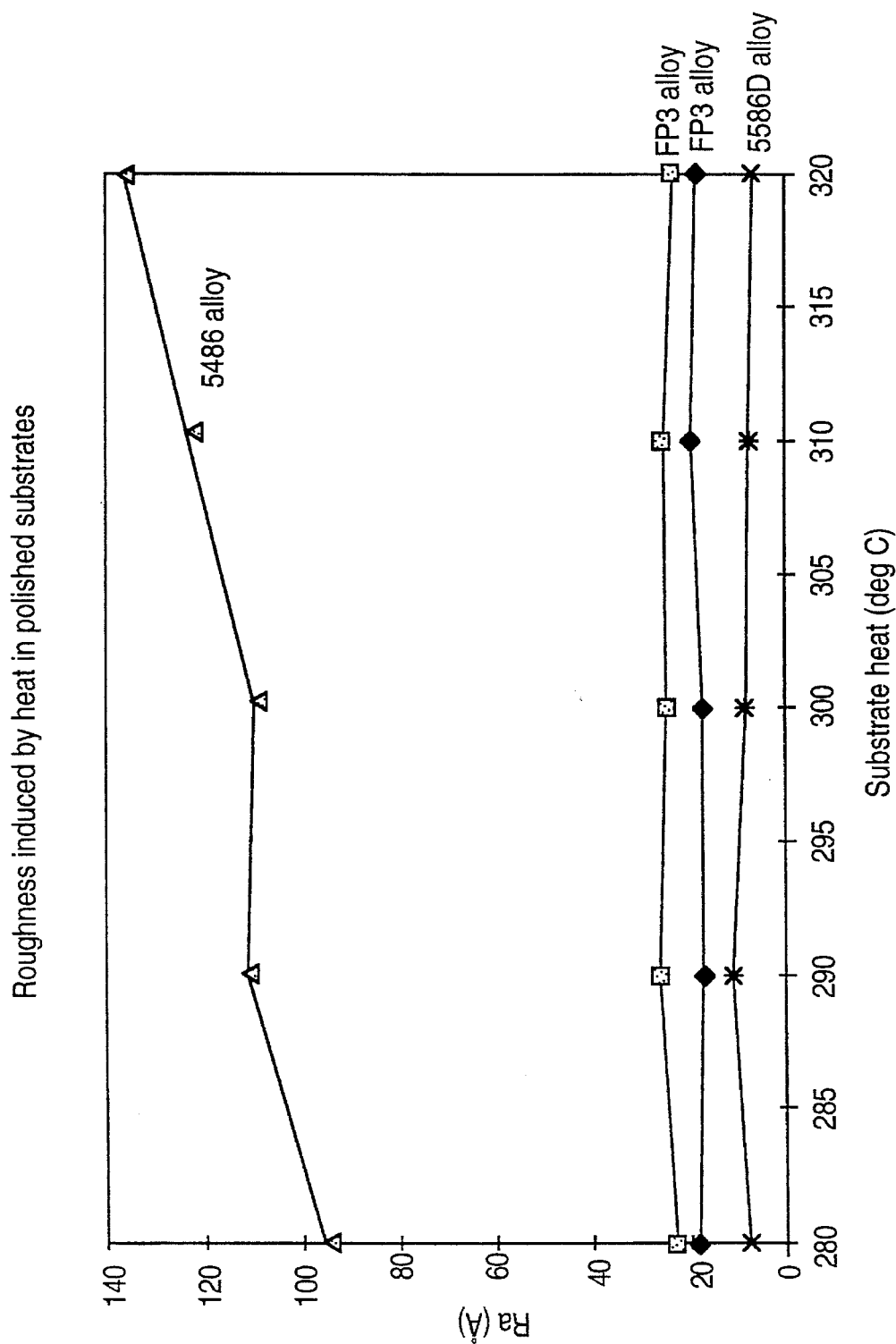
FIG. 5c shows substrate Ra values vs. temperature for various alloys that have been heated.

FIG. 5c illustrates the roughness Ra vs. heating temperature for alloys labelled 5486, FP3 and 5586D. The 5486 alloy has the composition set forth above in the description of FIGS. 3a and 3b. Alloy FP3 has a typical composition of 0.028 wt. % Si; 0.02 wt. % Fe, 0.02 wt. % Cu; 4.07 wt. % Mg; 0.05 wt. % Cr; 0.373 wt. % Zn; and the remainder Al. The 5586D alloy has a typical composition of 0.013 wt. % Si; 0.019 wt. % Fe; 0.054 wt. % Cu; 0.008 wt. % Mn; 3.94 wt. % Mg; 0.058 wt. % Cr; 0.141 wt. % Zn; 0.001 wt. % Ti; and the remainder Al. As can be seen, only alloy 5486 shows any noticeable improvement in roughness as temperature increases. This is because this alloy has the highest concentration of a super-saturated component (Mg).

FIGS. 7a and 7b show the stiction force experienced by a recording head as a disk drive is repeatedly turned on and off, i.e. during contact start stop (or "CSS") operation of the drive. FIG. 7a corresponds to a magnetic medium having the structure of FIG. 1 but which did not have a bump texture, while the medium of FIG. 7b was textured by heating the substrate to a temperature of 300° C. Both media had a Cr underlayer about 75 nm thick followed by a CoCrTa magnetic film about 45 nm thick and a hydrogenated carbon overcoat about 20 nm thick. The disks were coated with about 3.2 nm thick lubricant. For the CSS testing, a commercially available disk drive was used which had a peak rpm of 3600. The recording head was a standard 3.0 gmf thin film head having a 50% slider. (A "50% slider" is a well known term in the art, and is also referred to as a "nanoslider".) The total normal force exerted onto the media by the head was 3 grams. The stiction force on the head was measured using a strain gauge. As can be seen in FIG. 7a, when there was no bump texture, the stiction force experienced by the head was very high (it exceeded 12 grams) and caused the head to crash within a few hundred CSS cycles. On the other hand, FIG. 7b shows that the medium having a bump texture produced very little stiction force on the head and remained low (less than 6 grams), even up to 20,000 CSS cycles. The primary reason for this is believed to be that roughening the medium surface reduces the area of contact between the head and the medium.

FIG. 6 shows a cross-section profile of a typical texture bump 10. The length of bump 10, 1, is about 5 to 20 μm while the height of the bump, d, depends on the temperature of the disk as shown in FIGS. 5a and 5b. It is believed that the rounded surface of the bump offers a special advantage for improved mechanical reliability by reducing particle generation during CSS operation, and thereby reducing friction build up. Moreover, such a rounded surface also minimizes the local stress concentration as compared to the stress concentration imparted to a substrate having sharp peaks (such as the peaks formed when one mechanically textures disks, e.g. using a tape coated with hard abrasive particles).

Zone Texturing

In one embodiment, it may be desirable to form a relatively rough CSS zone and a relatively smooth data zone. The advantage of such zones are discussed in the above-incorporated '989 European Application.

Figure 8:
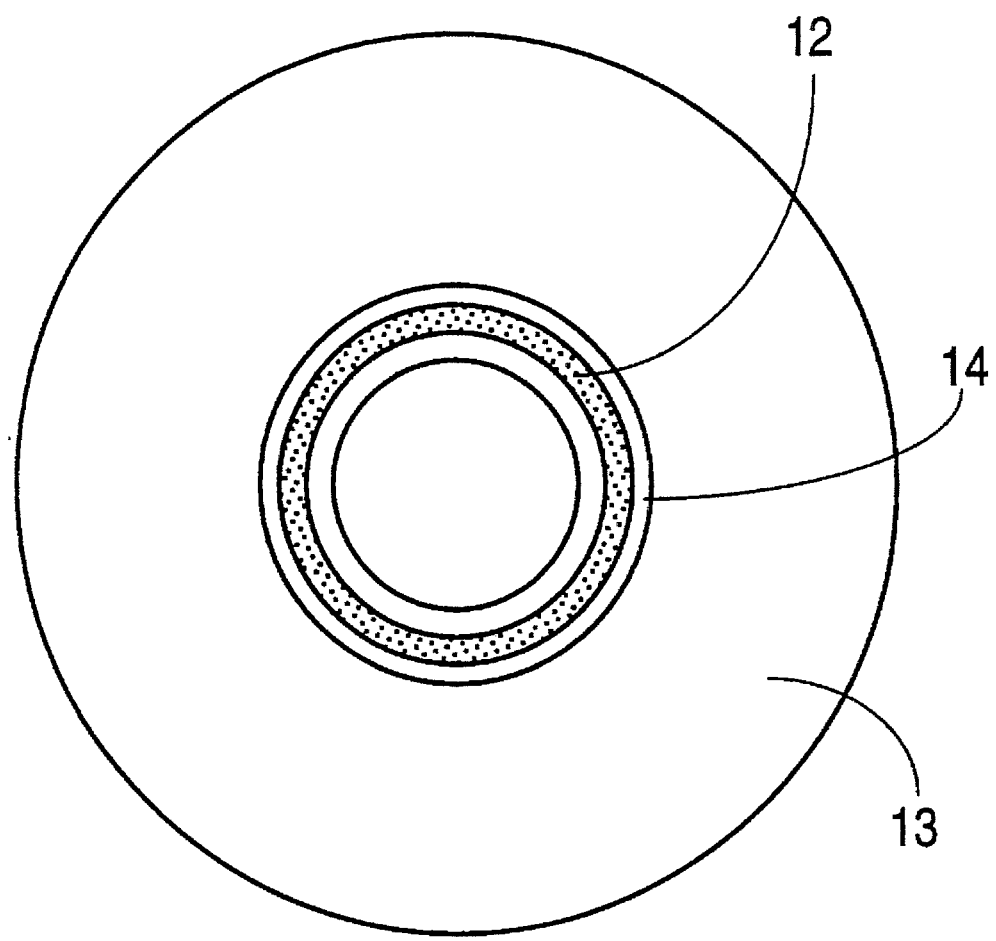
FIG. 8 shows a textured CSS zone and a data zone on a thin film medium.

FIG. 8 shows a CSS zone 12 where the recording head lands and takes-off during the starting and stopping of the drive. Although the preferable location of CSS zone 12 is close to the inner diameter of the disk, zone 12 can be located anywhere on the disk surface. Optionally, zone 12 may be a continuous annular area. Alternatively, zone 12 may comprise one or many sectored areas. A smooth data zone 13 surrounds CSS zone 12. A ramp zone 14 represents a transition region of gradual roughness change, from the roughness of zone 12 to the smoothness of zone 13.

Figure 10:
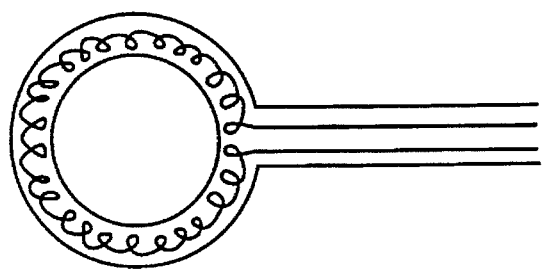
FIG. 10 schematically shows an annular heat lamp for forming a textured CSS zone.

FIGS. 9 and 10 schematically show two heater arrangements which can be used to make a bump textured CSS zone while leaving the data zone relatively smooth. In FIG. 9, a substrate 15 is held on one side of a mask 16 by an arm 17. A heater 18 is provided on the other side of mask 16. Heater 18 is typically the heater station for the MDP sputtering system manufactured by Intevac, Inc. The mechanical dimensions and spacing between the heater and the mask, the mask and the substrate, and the hole diameter depend on the size and thickness of the substrate. Mask 16 partially blocks heater 18 from heating substrate 15, except for an annular portion of substrate 15 behind a hole 19 formed in mask 16. This annular region is heated to a greater extent than the remainder of the substrate and is thus made into a rougher CSS zone. Because of heat diffusion in the substrate, a transition region exhibiting a gradual decrease in roughness is also formed surrounding the CSS zone.

Figure 11:
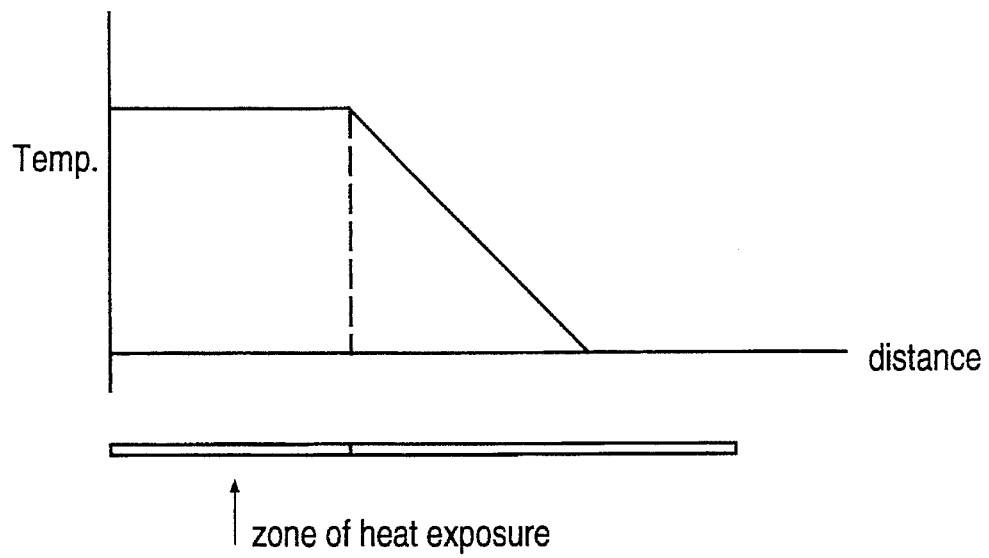
FIG. 11 shows the temperature profile in a substrate being heated.
Figure 12A:
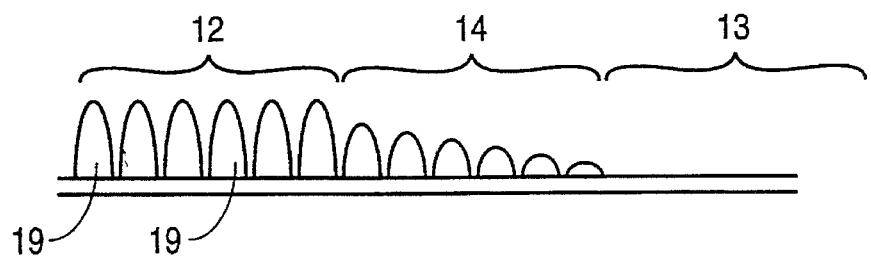
FIGS. 12a and 12b schematically show the cross section of a CSS zone including a transition region formed by a method in accordance with our invention, and a CSS zone formed by presently existing methods, respectively.
Figure 12B:
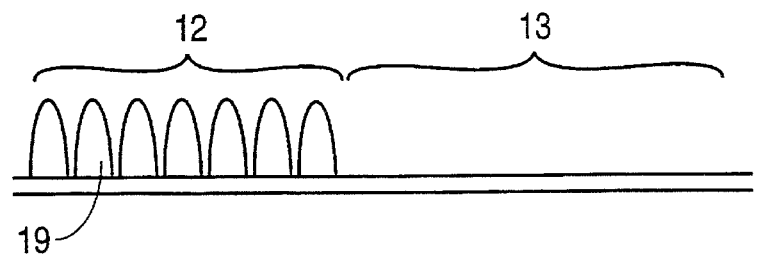

FIG. 11 shows the temperature profile of the disk during zone bump texture formation. While the temperature of the heat exposure area is expected to stay constant, it decreases monotonically towards the data zone. The expected resulting bump texture is shown in FIG. 12a. As can be seen in FIG. 12a, the bumps 19 on the substrate are relatively large in CSS zone 12, and gradually diminish in size in ramp zone 14. In data zone 13 there are no texture bumps. (None are needed, since the recording head never contacts data zone 12.) This is desirable compared to typical zone textures presently in use, e.g. as shown in FIG. 12b, in which there is no ramp zone 14. Because of the abrupt transition between zones 12 and 13 in FIG. 12b, the recording head may encounter difficulties when moving from one zone to the other.

Figure 12C:
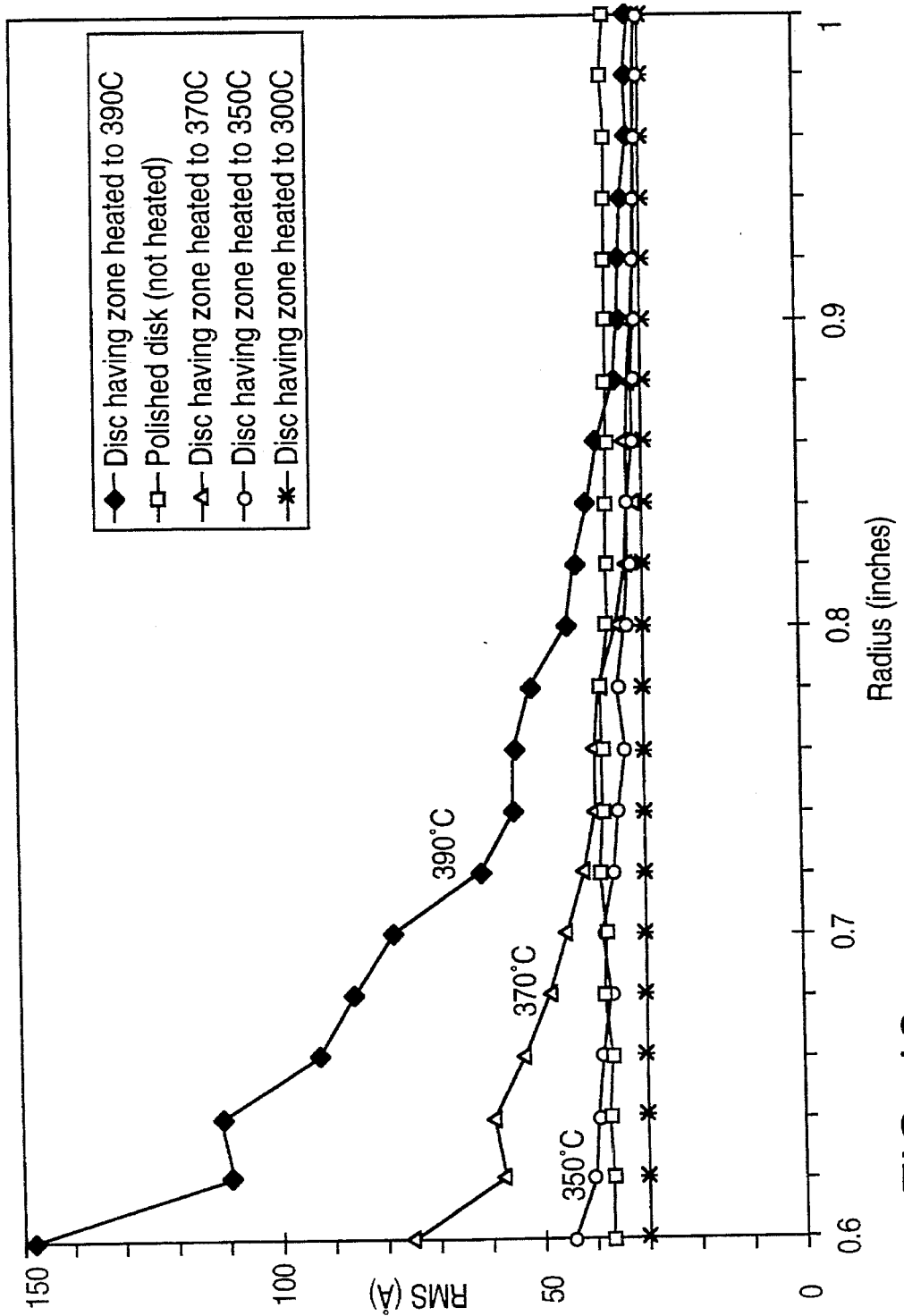
FIG. 12c shows the relationship between roughness and distance from the center of a disk for a disk that has been zone textured in accordance with our invention.

FIG. 12c shows a texture profile for a zone texture formed on a disk in accordance with our invention. The disks used to generate FIG. 12c included the 5586D alloy composition described above, zone textured by heating a region located adjacent the inner diameter of the disk to the temperature indicated in the figure. Because heat diffuses from the center to the periphery of the disk, a temperature profile is created which in turn generates the texture profile shown in FIG. 12c.

It is noted that in FIG. 5c, no texture was generated when the 5586D alloy was heated as high as 320° C. In FIG. 12c, it was possible to start forming texture bumps at 350° C. Of importance, the temperature required to form texture bumps is related to alloy composition. The greater the amount of the supersaturated alloy component, the lower the temperature needed to form the texture bumps.

FIG. 12c also shows that an RMS values of 45, 75 and 150 Å could be achieved by heating the substrate to 350° C., 370° C. and 390° C., respectively.

When heating the substrate to 370° C., a transition region about 0.7 inches wide was formed. By heating the substrate to 390° C., a transition region about 0.8 inches wide was formed. The width of the CSS zone plus the transition region should be greater than or equal to the width of the read-write head used with the disk, generally less than three times the width of the read-write head, and preferably less than or equal to about twice the width of the read-write head.

FIG. 10 illustrates an annular heating element that can be placed adjacent a substrate in lieu of the arrangement of FIG. 9 to form an annular rough CSS zone. Alternatively, a structure as shown in FIG. 8 can also be used but without mask 16 to heat and thereby texture the entire substrate. As mentioned above, these heating elements can be included in a chamber within a sputtering apparatus so that texturing and film deposition can be incorporated into one manufacturing operation.

Alternate Embodiment Using a Texture Film

Figure 13A:
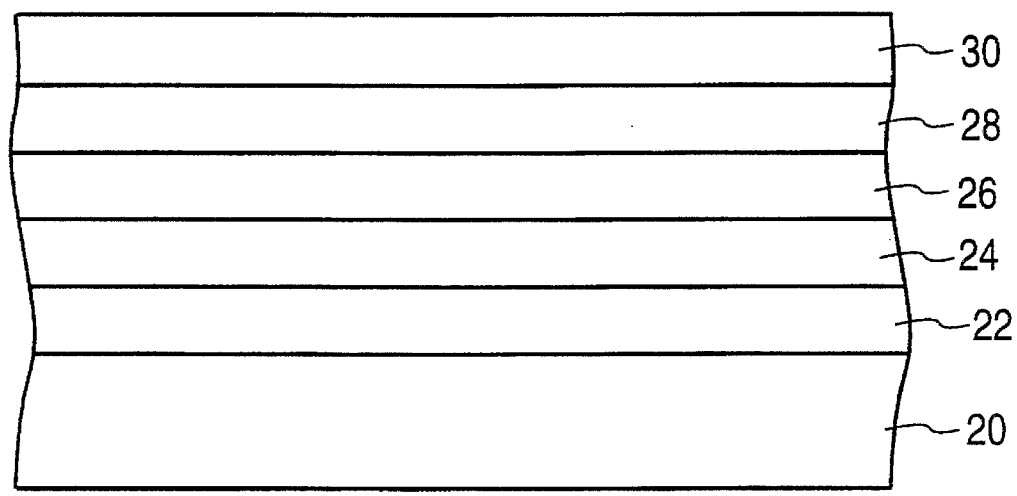
FIGS. 13a and 13b show a disk manufactured in accordance with alternative embodiments of our invention including an alloy film that is textured by heating.

In an alternate embodiment of our invention, instead of employing an alloy substrate which exhibits the precipitation phenomenon discussed above, a non-alloy substrate 20 such as a glass, carbon or ceramic substrate is employed (see FIG. 13a). A support layer 22 (typically Ni-P) is plated onto substrate 20. An alloy film 22, such as an Al alloy is then deposited onto Ni-P layer 22 to a thickness between 10 nm and 1 μm, and preferably between 0.1 and 0.2 μm, e.g. by sputtering, evaporation, plating or other technique. In one embodiment, layer 24 is deposited at a relatively low temperature (less than about 150° C.) at a relatively fast deposition rate (e.g. about 0.2 to 1 nm/second, or faster). This helps ensure that layer 24 is initially in the form of a super saturated solid solution. Substrate 20 and layers 22 and 24 are then heated and texture bumps form on layer 24 as the result of precipitation (e.g. by forming intermetallic compound regions or other precipitate second phase regions).

Thereafter, an underlayer 26 (e.g. as described in the above-incorporated Chen et al. '564 patent), a magnetic layer 28, a protective layer 30 and a lubricant layer are deposited on the disk.

Figure 13B:
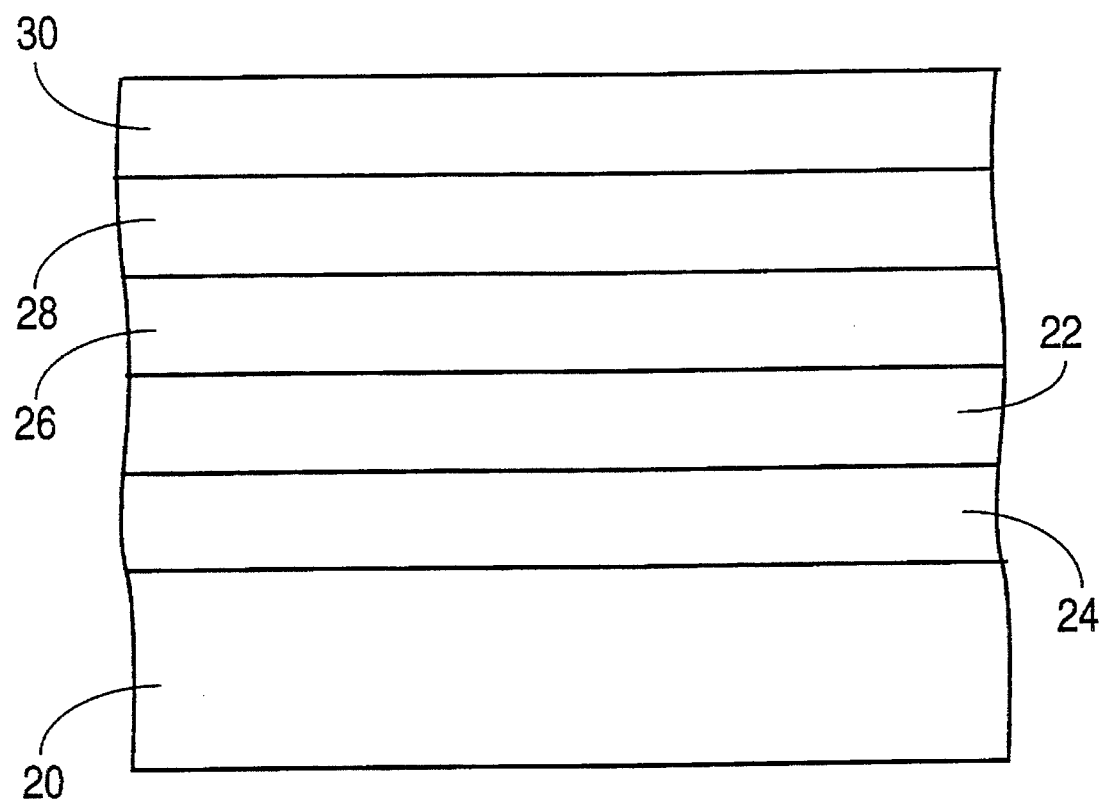

In another variation, support layer 22 is formed on substrate 20 after alloy film 24 is formed (see FIG. 13b). Thereafter, underlayer 26, magnetic layer 28 and protective layer 30 are formed. Deposition and heating of layer 24 and deposition of layers 26, 28 and 30 can be performed in one sputtering machine in one manufacturing operation.

In yet other embodiments, certain layers such as support layers 3 or 22 or underlayers 4 or 26 need not be formed. Further, as mentioned above, support layers 3 or 22, if formed, can be a suitably hard material other than NiP. In one embodiment, layer 24 comprises an alloy having the same composition as that set forth above for substrate 10, e.g. an Al alloy.

While the invention has been disclosed with respect to specific embodiments, those skilled in the art will recognize that changes can be made in form and detail without departing from the spirit and scope of the invention. For example, in the embodiment of FIG. 1, the heating step may be performed before or after support layer 3 is deposited before or after the various layers are (the underlayer, magnetic layer and overcoat) are deposited onto the substrate. In the embodiment of FIG. 13a, the heating step may be performed before or after layer 24 is deposited. In either embodiment, the various layers on the disk can be formed by techniques other than sputtering, e.g. plating or evaporation. In the embodiment of FIGS. 13a and 13b, substrate 20 can be an alloy. Further, substrate 20 can also exhibit the above-mentioned precipitation phenomenon, as well as layer 22.

What is claimed:

1. A method for manufacturing a magnetic disk comprising the step of providing a substrate comprising a solid solution;

heating said substrate, thereby causing bumps to form on said substrate while maintaining the substrate below the melting temperature of said substrate; and depositing a magnetic layer on said substrate.

2. Method of claim 1 wherein said substrate is a super saturated solid solution prior to said step of heating, said step of heating causing precipitate regions to form in said substrate.

3. Method of claim 1 wherein said substrate is an Al alloy comprising at least one element from the list of elements consisting of Si, Mg, Fe, Cu, Zn, Co, Cr, Pb, Ge, Sn, Mo, W, V, Nb, Ta, Zr and Hf.

4. Method of claim 1 further comprising the step of plating a support layer onto said substrate prior to said step of heating and prior to said step of depositing.

5. Method of claim 4 further comprising the step of depositing an underlayer between said support layer and said magnetic layer.

6. Method of claim 1 wherein said step of depositing comprises the step of vacuum-depositing said magnetic layer in a vacuum-deposition apparatus, said step of heating also being performed in said vacuum-deposition apparatus.

7. Method of claim 6 wherein said step of vacuum-depositing comprises sputtering.

8. Method of claim 1 wherein said substrate is heated to a temperature between 100° and 500° C.

9. Method of claim 1 wherein said step of heating causes a texture to form on said substrate having an Ra value between 1 and 15 nm.

10. Method of claim 9 wherein said Ra value is between 5 and 10 nm.

11. Method of claim 1 wherein said step of heating is performed in a selected region of said substrate to thereby zone texture said substrate.

12. Method of claim 11 wherein said substrate is zone textured to form a CSS region and a transition region less than 0.7 inches wide.

13. Method of claim 12 wherein said transition region is greater than 0.1 inches wide.

14. A disk made by the method of claim 1.

15. Method comprising:

depositing a solid solution film on a substrate;

heating said solid solution film to thereby form bumps thereon while maintaining the temperature of said film below the melting temperature of said solid solution; and depositing a magnetic film on said alloy film.

16. Method of claim 15 in which prior to said step of heating, said solid solution is a super-saturated solid solution.

17. Method of claim 15 wherein said solid solution is an Al alloy comprising at least one element from the list of elements consisting of Si, Zn, Mg, Cu, Fe, Co, Cr, Pb, Ge, Sn, Mo, W, V, Nb, Ta, Zr and Hf.

18. Method of claim 15 further comprising the step of depositing an underlayer between said magnetic film and said solid solution film.

19. Method of claim 15 further comprising the step of depositing a mechanical support layer between said substrate and said solid solution film.

20. Method of claim 15 wherein said step of depositing a magnetic film comprises the step of vacuum-depositing said magnetic film in a vacuum-deposition apparatus, said step of heating being formed within said apparatus.

21. Method of claim 20 wherein said step of vacuum-depositing comprises sputtering.

22. Method of claim 15 wherein said solid solution film is heated to a temperature between 100° and 500° C.

23. Method of claim 15 wherein said step of heating causes a texture to form on said solid solution film having a Ra value between 3 and 15 nm.

24. Method of claim 23 wherein said Ra value is between 5 and 10 nm.

25. Method of claim 15 in which said step of heating results in a zone texture.

26. A disk manufactured by the method of claim 15.

* * * * *